(12) United States Patent
Trump

(10) Patent No.: US 8,567,766 B1
(45) Date of Patent: Oct. 29, 2013

(54) TENSIONING BAR ASSIST DEVICE

(76) Inventor: Jeffrey Curtis Trump, Washington, PA (US)

(*) Notice: Subject to any disclaimer, the term of this patent is extended or adjusted under 35 U.S.C. 154(b) by 0 days.

(21) Appl. No.: 13/589,071

(22) Filed: Aug. 17, 2012

(51) Int. Cl.
*B66F 3/00* (2006.01)
(52) U.S. Cl.
USPC .......................................... 254/243; 74/544
(58) Field of Classification Search
USPC .................... 254/243, 245, 248; 74/543–547
See application file for complete search history.

(56) References Cited

U.S. PATENT DOCUMENTS

| 7,389,971 B2* | 6/2008 | Gaudreault et al. | 254/243 |
| 2003/0155748 A1* | 8/2003 | Picard et al. | 280/656 |

* cited by examiner

*Primary Examiner* — Emmanuel M Marcelo
*Assistant Examiner* — Angela Caligiuri
(74) *Attorney, Agent, or Firm* — Karen Tang-Wai Sutton

(57) ABSTRACT

An assist device for use with a tensioning bar, the device comprising a pair of surfaces in spaced apart relation affixed to a u-shaped wall, creating an open ended box, and a pair of through bores located along a central vertical axis of each surface. The assist device is removably or permanently coupled to the tensioning bar. The tensioning bar is inserted into a truck winch, and a user facing the assist device and the truck winch, perpendicular to longitudinal axis of the bar, pushes down on an upper surface of the assist device using hands or a foot in a pumping motion, causing the bar to pivot downwards from the winch, and thus tightening or loosening the strap.

5 Claims, 7 Drawing Sheets

TENSIONING BAR ASSIST DEVICE

TECHNICAL FIELD

The present invention pertains to the field of tensioning bars. More particularly, the present invention pertains to tensioning bars used with truck winches for tightening and loosening woven straps used to secure loads on flatbed trucks.

BACKGROUND OF THE INVENTION

Flatbed trucks use either chains or winch straps to secure the loads they carry. A typical truck driver makes multiple deliveries per day, and each delivery stop requires the driver to loosen and then secure a minimum of either two straps or chains. Chains are used for only some loads, as they can cause damage to the loads themselves, and in those cases, flat woven straps are used in lieu of chains. Therefore, most flatbed drivers carry both chains and winch straps to be prepared for whatever load they may have.

If winch straps are used, a truck winch, typically configured as a self-locking winch, and a winch tensioning bar are necessary for tightening and loosening the straps. The bar is a simple metal rod with a winch coupling end designed to be inserted into one of the many holes in the bar receiving part of the winch. Some embodiments of the tensioning bar include an angled winch coupling end, as this tends to make the bar easier to use. A typical bar is model 30370 manufactured by the Kinedyne Corporation, the bar being 35 inches long and weighing about 5.2 lbs, and featuring an angled winch coupling end. In use, a user stands perpendicular to the truck body and to the winch, and parallel to the length of the bar, with both hands on the bar, and by pumping up and down on the bar, the winch is engaged and the strap is tightened. To loosen the strap, the winch coupling end is inserted into the winch, and by applying firm downward pressure on the tensioning bar, the winch lock can be disengaged, allowing the winch to free-wheel and loosen the strap. Regardless of the tensioning bar design, the bars are designed to only be used in a position angled downward from the bar receiving end of the winch, which serves as the pivot point. Given the design of the bar, the user is forced stand to the side and push down with both hands, causing the user's body to unevenly exert force on the bar, which can result in injury to the back or neck. The inventor himself has actually incurred two herniated discs in his neck as a result of pushing down on this bar due to the awkward position required by the bar design.

What is needed is an assist device that allows a user to evenly apply force to the tensioning bar by standing at the end of the bar, facing the truck and the winch, and allowing the user the option of engaging the bar using either his hands or a foot.

DISCLOSURE OF INVENTION

The invention is a tensioning bar assist device typically comprised of a pair of surfaces in spaced apart relation joined along their peripheral edges by a U-shaped wall, creating a box-like structure with an open end. Each surface features a pair of through-bores located along a central, vertical axis, into which fasteners are inserted. The assist device is removably affixed to a tensioning bar receiving end, into which a pair of through-bores have been created, and the fasteners are inserted into all the respective through bores. In an alternative embodiment, the assist device is permanently installed on the tensioning bar by welding or other suitable methods.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
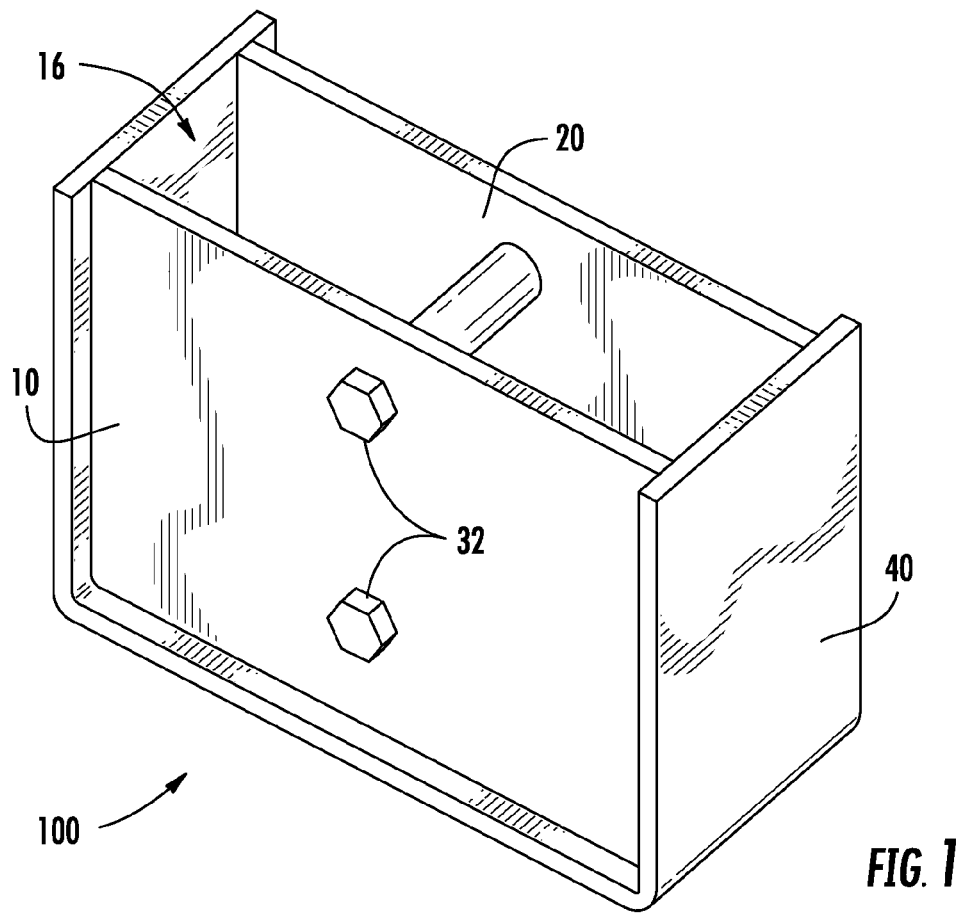
FIG. 1 is a perspective view of the tensioning bar assist device according to the invention.
Figure 2:
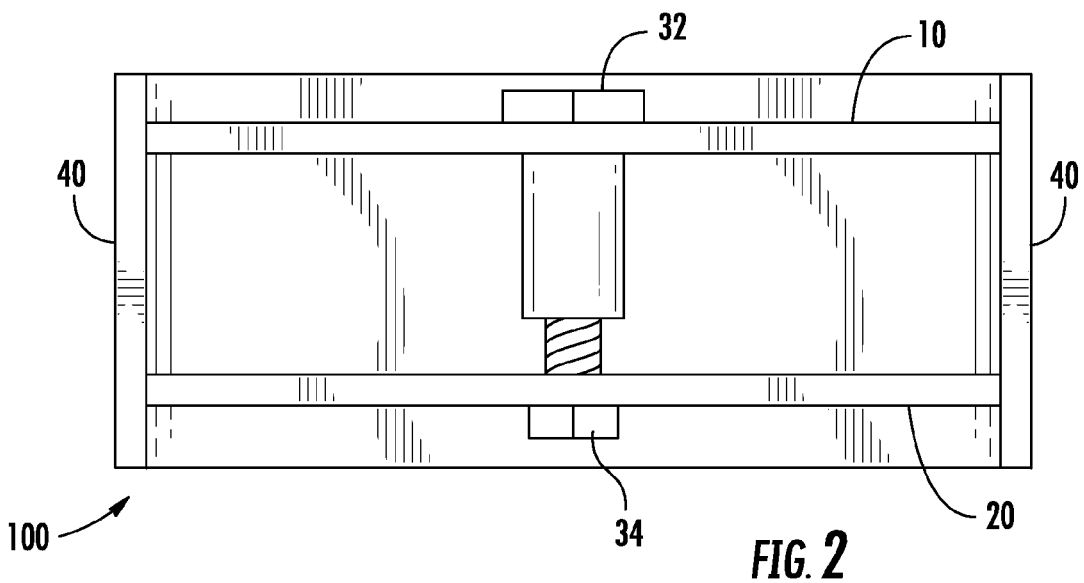
FIG. 2 is a top elevational view of the tensioning bar assist device according to the invention.
Figure 3:
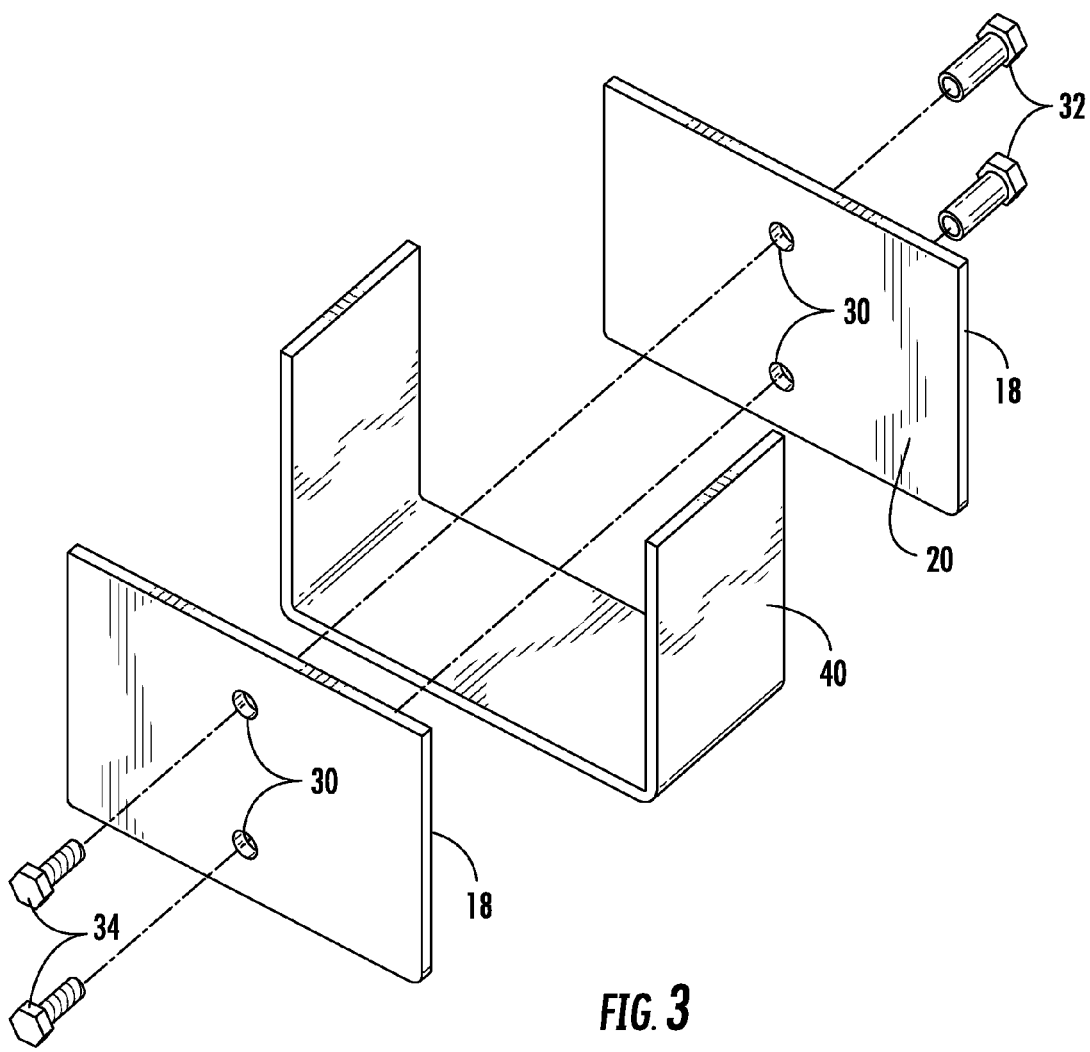
FIG. 3 is an exploded view of the tensioning bar assist device according to the invention.

The following is a list of reference labels used in the drawings to label components of different embodiments of the invention, and the names of the indicated components.

100 tensioning bar assist device
10 top surface
16 open end of assist device
18 outer edge or peripheral edge of top and bottom surfaces
20 bottom surface
30 through bore
32 fastener
34 fastener
40 U-shaped wall
50 tensioning bar
52 winch coupling end
54 straight device receiving end
56 receiving slot
60 winch
62 bar receiving member
70 truck
72 flat woven strap

DETAILED DESCRIPTION

FIGS. 1-3, and 6-7B show a typical embodiment of the tensioning bar assist device according to the invention. The tensioning bar assist device 100 is comprised of a top surface 10 and bottom surface 20, the two surfaces held in spaced apart relation by a U-shaped wall 40 rigidly affixed to the outer or peripheral edges 18 of the top and bottom surfaces 10 20, creating a box-like structure with an open end 16. Each surface 10 20 has a central vertical axis upon which a pair of through bores 30 are located. A corresponding set of fasteners 32 34 are inserted into the through bores 30. Suitable fasteners include regular bolts fastened with nuts, as well as barrel bolts 32 and machine screws 34 shown in FIG. 3. To install the tensioning bar assist device 100 onto a tensioning bar 50 with a winch coupling end 52 and a straight device receiving end 54, as shown in the embodiment described in FIGS. 6-7B, an additional pair of through bores (not shown) are formed in the receiving end 54. The receiving end 54 is inserted into the open end 16 of the assist device 100 (see FIG. 1), and fasteners 32 34 are inserted into the respective through bores 30 and tightened. In another typical embodiment (not shown), the tensioning bar assist device 100 is permanently installed on the tensioning bar by welding the assist device directly onto the tensioning bar, or by forging the tensioning bar and the assist device out of a single piece of metal.

Figure 4A:
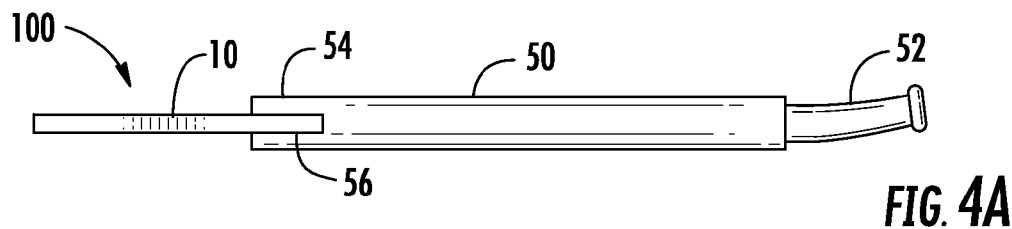
FIGS. 4A-D are top and side elevational views of two embodiments of the tensioning bar assist device according to the invention, as installed on a typical tensioning bar.
Figure 4B:
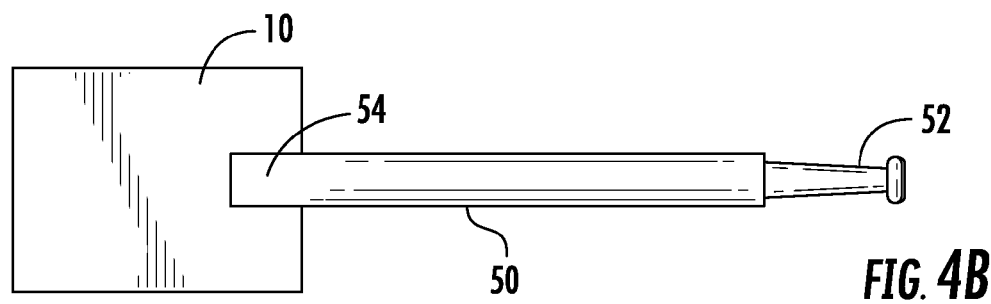
Figure 4C:
Figure 4D:
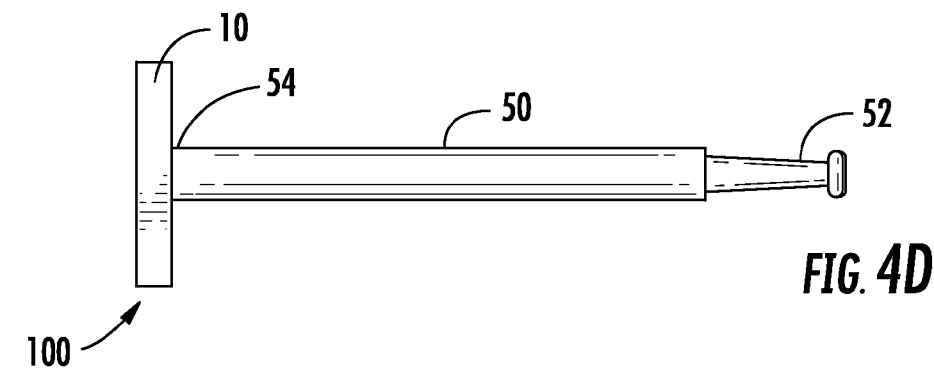

FIGS. 4A-D show two embodiments of the tensioning bar assist device according to the invention. FIGS. 4A-B show a top elevational view and a side elevational view, respectively, of a paddle-like assist device 100 having a top surface 10 affixed to the straight device receiving end 54 via a receiving slot 56 cut into the top surface 10. The top surface 10 is bolted or welded to the straight device receiving end 54. FIGS. 4C-D show a top elevational view and a side elevational view, respectively, of a T-shaped assist device 100, wherein a bar-shaped top surface 10 is perpendicular to a threaded second surface (not shown), forming a T-shape, the threaded second surface screwed into a corresponding mating end 54 (not shown) of the tensioning bar 50 for an assist device that is removably installed without the aid of tools. Alternatively, the receiving end 54 may be threaded and the T-shaped assist device formed with a corresponding mating structure adapted to receive the receiving end 54. The assist device shown in FIGS. 4C-D may be permanently installed on the tensioning bar by welding, or removably installed, with the aid of tools, by bolting, or using some other suitable fasteners.

Figure 5:
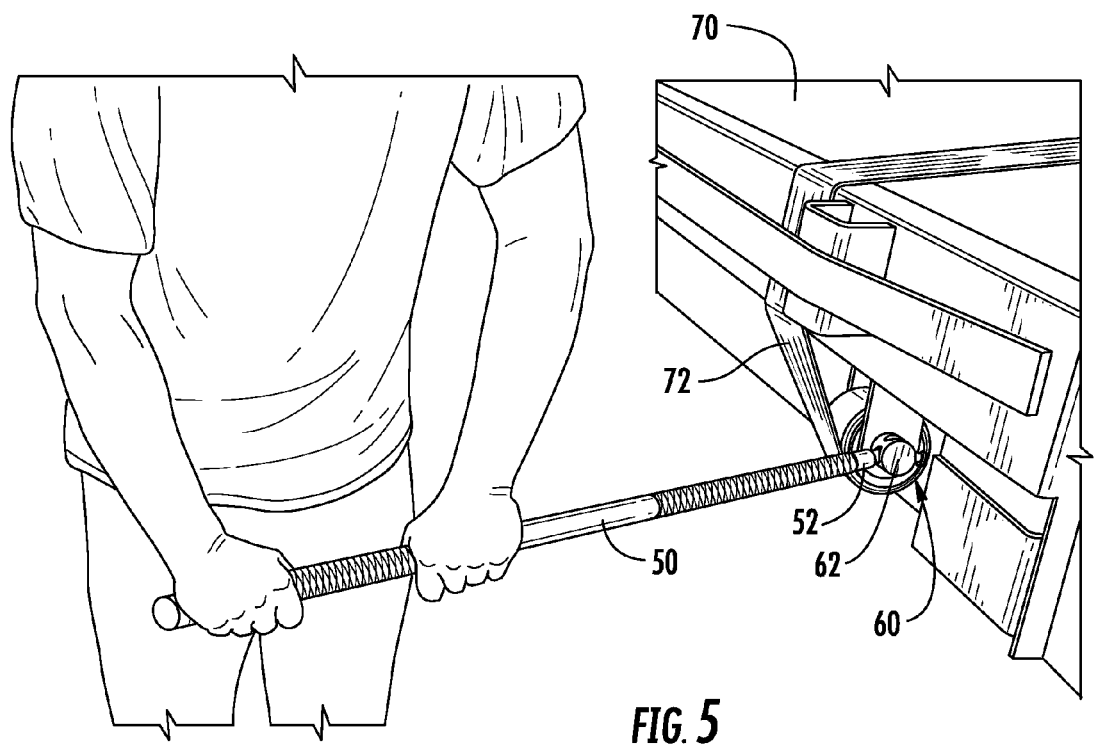
FIG. 5 is a perspective view of a prior art tensioning bar in use with a truck winch, showing a user's hands positioned on the prior art tensioning bar, the user's body parallel to the length of the bar.
Figure 6:
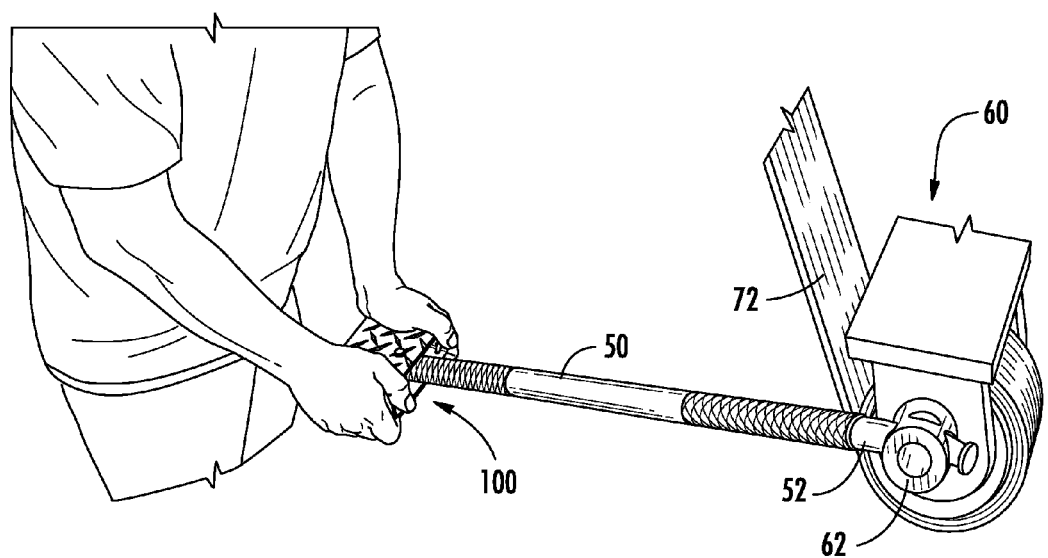
FIG. 6 is a perspective view of the tensioning bar assist device according to the invention, as installed on a tensioning bar, shown with the user's hands positioned on either side of the assist device, the user's body located opposite the side of an open end of the assist device and perpendicular to the longitudinal axis of the bar. Note the user's hands do not grasp any part of the bar.
Figure 7A:
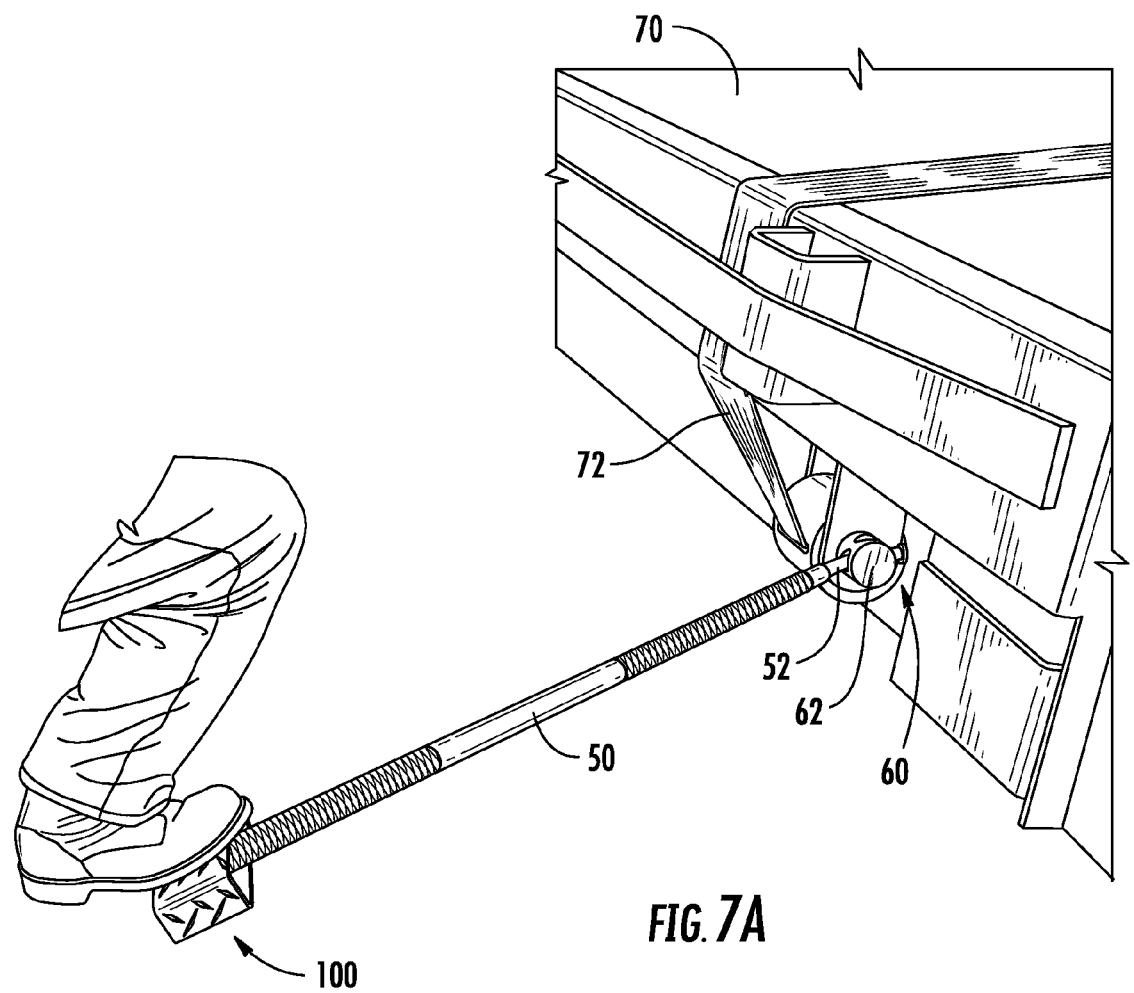
FIG. 7A is a perspective view of a tensioning bar assist device according to the invention, as installed on the tensioning bar shown in FIG. 6, shown with the user standing with the front of his body facing the truck and winch, with the user positioning a foot on the assist device.
Figure 7B:
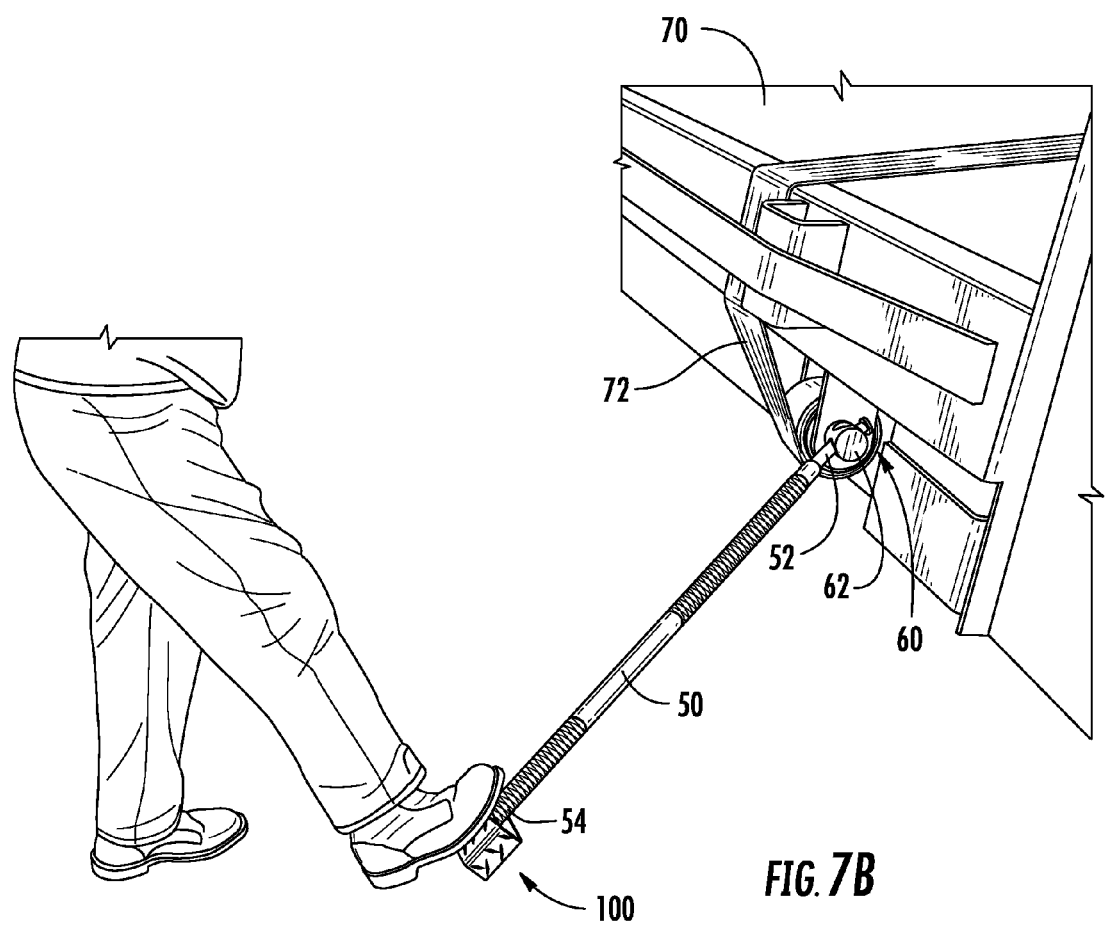
FIG. 7B is a perspective view of the tensioning bar assist device shown in FIG. 7A, shown with the user standing with the front of his body facing the truck and winch, with his foot on the assist device, as shown when the user presses downwards on the device with his foot to turn the winch and tighten the strap.

FIG. 5 shows a prior art tensioning bar (without the assist device) as used by a user with a truck winch 60. The user is shown with both hands positioned in spaced apart relation along the longitudinal axis of the tensioning bar 50. FIGS. 6-7B show the tensioning bar assist device according to the invention, as installed on a tensioning bar, shown with the user standing perpendicular to the longitudinal axis of the bar 50 and opposite the open end 16 (see FIG. 1) of the tensioning bar assist device 100. In contrast to the prior art tensioning bar 50 shown in FIG. 5, in FIGS. 6-7B, according to the tensioning assist device, no part of the user's body contacts the tensioning bar 50. The tensioning bar assist device 100 is first removably or permanently installed on the tensioning bar 50. The winch coupling end 52 of the bar 50 is inserted into a bar receiving member 62 of the truck winch 60 that is securely fastened to a truck 70. A strap 72 is inserted into the winch 60. FIG. 6 shows the user standing directly in front of the assist device 100, perpendicular to the longitudinal axis of the bar 50. Either by grasping the assist device (FIG. 6) or by stepping onto the assist device with a foot (FIGS. 7A-B), the user applies a downwards force onto the assist device, thereby causing the tensioning bar to pivot downwards, rotating the winch and tightening the strap 72 (FIGS. 7A and 7B). The assist device 100 thus provides the user better leverage when tightening or loosening the strap and well as a more egonomic way of tightening or loosening the strap, since the entire force of the user's body may be used without twisting or unequal application of force, and provides the user the option of using just his hands or a single foot to tighten/loosen the strap. The assist device 100 thus reduces possible injury to the user by positioning the user's body such that no twisting or unequal application of force by the user's body is required, and allowing the user to employ leg muscles, which are typically larger and stronger in an average user when compared to the user's arm muscles.

The tensioning bar assist device 100 according to the invention is typically made of ³⁄₁₆" aluminum tread plate, with the top and bottom surfaces welded to the U-shaped wall, creating a metal box with an open end. However, it should be noted that all the embodiments shown in the Figures as well as a tensioning bar assembly comprising of a tensioning bar and assist device together, can be made with other suitable materials include structural plastic, fiberglass, and other metals such as steel.

It is to be understood that the above-described arrangements are only illustrative of the application of the principles of the present invention. Numerous modifications and alternative arrangements may be devised by those skilled in the art without departing from the scope of the present invention. For instance, while the inventor believes the open-ended box shape according to the invention is both economical and ergonomic, other shapes which include a flattened or widened surface capable of receiving a foot or a pair of hands may also be suitable. The assist device shown in the Figures as being removably affixed but in use is usually left installed on the tensioning bar 50 for convenience. Alternatively, the assist device can be permanently installed by welding, or by forming a tensioning bar assembly, comprising of the bar plus the assist device, by forging the assembly out of a single piece of metal or by molding a single assembly from structural plastic or fiberglass. The embodiment shown in the FIGS. 4C-D in particular contemplates an assist device which can be easily installed or removed without any tools, simply by screwing or unscrewing the device from the tensioning bar but it should also be noted that this embodiment can also easily be more permanently installed by welding, or removably installed using bolts (requiring tools). The Figures also show the tensioning bar as having an angled winch coupling end, however, the assist device can be installed on a straight tensioning bar, and the depiction of the angled winch coupling end is merely illustrative of one common type of bar widely used and available.

What is claimed is:

1. A tensioning bar assist device, suitable for use with a tensioning bar used to adjust a truck winch, the tensioning bar having a winch coupling end and an opposed end having a pair of tensioning bar through bores, the assist device (100) comprising:

a top surface (10) and a bottom surface (20) in spaced apart relation, each surface having a peripheral edge (18) extending around an outermost edge of the top surface and the bottom surface;

a U-shaped exterior wall (40) affixed to the peripheral edge (18) of the top surface (20) and the bottom surface (20);

at least two through bores (30) located along a vertical central axis of the top surface (10) and the bottom surface (20); and at least two fasteners (32) (34) inserted into the through bores (30), wherein the top surface, bottom surface, and the U-shaped exterior wall define an interior space having five walled surfaces and one open side, and an interior width spanning the interior space between the top surface and the bottom surface sized and shaped to receive the tensioning bar opposed end, and wherein the at least two fasteners are sized to span the interior width, whereby the opposed end of the tensioning bar inserted into the interior space is secured thereto by the at least two fasteners (30) inserted into all the through bores of the top surface, bottom surface, and opposed end.

2. The assist device of claim 1, wherein the device is made of aluminum.

3. The assist device of claim 1, wherein the device is made of plastic.

4. A tensioning bar assembly suitable for use with a truck winch affixed to a truck and a flat strap (72) inserted into the truck winch, the truck winch further comprising a winch lock and a bar receiving end (62), the tensioning bar assembly comprising:

a tensioning bar (50) having a winch coupling end (52) and an opposed assist device receiving end (54); and an assist device (100) having a top surface (10);

a receiving slot (56) formed into the top surface (10);

at least two through bores (30) formed into both the top surface (10) and the receiving end (54); and a plurality of fasteners (32) (34), wherein the top surface (10) of the assist device (100) is coupled to the assist device receiving end (54) by inserting the receiving end (54) into the receiving slot (56) and fastening the plurality of fasteners (32) (34) into the at least two through bores (30) formed in both the top surface (10) and in the receiving end (54), whereby a user positioned in front of the assist device (100) facing the winch and perpendicular to the longitudinal axis of the tensioning bar (50), applies a downwards force on the assist device (100) multiple times causing the tensioning bar (50) to pivot downwards from the bar coupling end (62), tightening the flat strap, and by applying a single downwards force on the assist device (100), allows the user to unlock the winch lock and loosen the flat strap.

5. The tensioning bar assembly of claim 4, wherein the assembly is comprised of a single piece of metal.

\* \* \* \* \*